United States Patent

Jones

[11] Patent Number: 5,411,922
[45] Date of Patent: May 2, 1995

[54] NEUTRAL GRAY-GREEN LOW TRANSMITTANCE HEAT ABSORBING GLASS

[75] Inventor: James V. Jones, Toledo, Ohio

[73] Assignee: Ford Motor Company, Dearborn, Mich.

[21] Appl. No.: 172,979

[22] Filed: Dec. 27, 1993

[51] Int. Cl.⁶ ............................................. C03C 3/087
[52] U.S. Cl. ........................................ 501/71; 501/70; 501/904; 501/905
[58] Field of Search ................... 501/70, 71, 904, 905

[56] References Cited

U.S. PATENT DOCUMENTS

| | | | |
|---|---|---|---|
| Re. 25,312 | 1/1963 | Duncan et al. | 501/71 |
| 2,524,719 | 10/1950 | Tillyer | 501/70 |
| 2,636,420 | 4/1953 | Ryan et al. | 501/71 X |
| 2,688,559 | 9/1954 | Armistead | 501/71 |
| 2,699,399 | 1/1955 | Armistead | 501/61 |
| 2,898,219 | 8/1959 | Duncan et al. | 501/57 |
| 2,923,636 | 2/1960 | Swain | 501/71 |
| 3,148,073 | 9/1964 | Smith et al. | 501/72 |
| 3,294,556 | 12/1966 | Harrington | 501/71 |
| 3,294,561 | 12/1966 | Duncan et al. | 501/71 |
| 3,296,004 | 1/1967 | Duncan | 501/71 |
| 3,300,323 | 1/1967 | Plumat et al. | 501/70 |
| 3,498,806 | 3/1970 | Hammer et al. | 501/71 |
| 3,628,932 | 12/1971 | Inoue et al. | 501/70 X |
| 3,723,142 | 3/1973 | Kato et al. | 501/71 |
| 3,904,425 | 9/1975 | Young et al. | 501/71 |
| 4,104,076 | 8/1978 | Pons | 501/66 |
| 4,339,541 | 7/1982 | Dela Ruye | 501/71 |
| 4,345,037 | 8/1982 | Fyles et al. | 501/38 |
| 4,792,536 | 12/1988 | Peloraro et al. | 501/70 |
| 4,873,206 | 10/1989 | Jones | 501/71 |
| 5,023,210 | 6/1991 | Krumwiede et al. | 501/71 |
| 5,030,593 | 7/1991 | Heithoff | 501/72 |
| 5,264,400 | 11/1993 | Nakaguchi et al. | 501/71 |
| 5,308,805 | 5/1994 | Baker et al. | 501/71 |
| 5,320,986 | 6/1994 | Taniyuchi et al. | 501/70 |
| 5,346,867 | 9/1994 | Jones et al. | 501/71 |
| 5,352,640 | 10/1994 | Combes et al. | 501/71 |
| 5,362,689 | 11/1994 | Morimoto et al. | 501/70 |

FOREIGN PATENT DOCUMENTS

| | | | |
|---|---|---|---|
| 482535A1 | 4/1992 | European Pat. Off. | |
| 2082647 | 12/1971 | France | 501/70 |

Primary Examiner—Mark L. Bell
Assistant Examiner—David R. Sample
Attorney, Agent, or Firm—Lorraine S. Melotik; Roger L. May

[57] ABSTRACT

A heat absorbing, neutral gray to green, soda-lime-silica glass having at 4 mm. control thickness a light transmittance using illuminant A of 10.0% to 60.0%, ultra violet transmittance less than 25.0%, infra red transmittance is less than about 50.0%, and the purity of excitation is less than 6.0% which is produced from colorants consisting of 0.90 to 1.90 percent by weight total iron oxide as $Fe_2O_3$, 0,002 to 0.025 percent Co, 0.0010 to 0.0060 percent Se, and 0.1 to 2.0 percent $TiO_2$. The flat glass products having such a composition is particularly suitable for use as a privacy glass or sun roof product in trucks and automobiles.

9 Claims, No Drawings

NEUTRAL GRAY-GREEN LOW TRANSMITTANCE HEAT ABSORBING GLASS

BACKGROUND OF THE INVENTION

This invention is directed to a heat absorbing, neutral gray-green colored glass composition. More particularly, it comprises soda-lime-silica glass which uses titanium dioxide in combination with other coloring components which consist essentially of iron oxide, selenium and cobalt oxide to provide a particular excitation purity and color to a glass composition.

The majority of glass used in automotive vehicles, e.g., for the windshield and backlite, is green in color and has heat absorbing properties. A glass of green color is used because it coordinates well with a wide range of vehicle paint colors. It is desirable to have still other green or neutral gray-green glasses available which are similar in color to such glass, yet in addition have lower infra red transmittance and lower total solar energy transmittance. This combination of properties would make these other glasses ideally suited be used as other windows of the vehicles, e.g., those back of the B-pillar or the sunroof while color coordinating with the windshield glass. Such lower transmittance glasses would aid in reducing the heat gain in the vehicle interior while also providing privacy. Glass with these properties would be highly desirable for not only automotive applications but for architectural use as well. It would further be desirable if the glass exhibited a broad range of visible transmittance and was also compatible with flat glass manufacturing methods.

Those skilled in the art know that adding or substituting one colorant for another and/or changing the amount or relative proportion of colorants in a glass composition affects not only the color of the glass, i.e., dominant wavelength and excitation purity, but also can affect the light transmission of the glass and its structural qualities. Furthermore, there is in many cases substantial complexity and unpredictability in these effects. Thus, for example, even if the proper alteration in the composition of a particular colored glass were determined for achieving a desired color shift, the same alteration, unfortunately, would also alter (for example, unacceptably reduce) the light transmission value of the glass. It may, of course, also undesirably alter the purity of the glass color. In short, all these factors—dominant wavelength, purity and light transmission—are variable and may vary unpredictably with each other. In the case of heat absorbing glass, additional properties of ultraviolet transmittance and infra red transmittance are also to be considered.

Developing a new glass composition, therefore, having a particular color, certain low purity, appropriate light transmittance, ultraviolet transmittance and infra red transmittance, is in some cases very difficult. An experimental change in the amount or relative proportions of one or more colorants in a glass composition intended to bring one of these numerical values closer to a target value causes one or all of the other values simultaneously to drift off target (or further off target). I have found that obtaining my desired glass composition required maintaining the coloring components of iron oxide, selenium, cobalt oxide and titanium oxide within precise ranges.

Gray colored heat absorbing glasses relied, in the past, on the inclusion of nickel oxide as an active coloring agent. Nickel compounds, however, are known to react with other materials in soda-lime-silica glass and form nickel sulfide "stones" in the glass. These stones are usually small, thereby avoiding detection methods, but can produce an unacceptably high rate of breakage during tempering. U.S. Pat. No. 5,023,210 to Krumwiede et. al. discloses the use of chrome oxide in combination with iron oxide, cobalt oxide and selenium to achieve a dark gray glass without nickel. U.S. Pat. No. 3,300,323 to Plumat, et al. discloses a gray glass having coloring components: 0.05 to 0.5 wt. % $Fe_2O_3$, 2.0 to 6.0 wt. % $TiO_2$, 0.005 to 0.010 CoO, and optionally manganese oxide. The Plumat, et al. glass does not contain selenium, however, as required in the present invention and has higher visible transmittance and limited heat absorbing properties.

Other heat absorbing gray glass compositions contain selenium as an essential coloring component. For example, U.S. Pat. No. 4,873,206 to Jones discloses a gray glass composition which includes as the colorants only iron oxide, cobalt, and selenium. This composition, however, generally uses less iron oxide than this invention and has substantially higher infra-red and ultraviolet transmittance which limits the value as an automotive product. European Patent 0 482 535 to Longobardo, et al., while using iron oxide, cobalt oxide, and selenium in forming a gray glass, specifically excludes titanium oxide which is considered a vital part of the present invention glass composition to ensure its neutral gray to green color.

SUMMARY OF THE INVENTION

The present invention is a glass composition that is heat absorbing, gray to green in color and possesses less than 6% excitation purity. The composition in its broadest embodiment comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, with traces of melting and refining aids, if any, and colorants consisting essentially of: 0.90 to 1.90 wt. % total iron oxide as $Fe_2O_3$; 0.006 to 0.025 wt. % cobalt oxide as Co; 0.0010 to 0.0060 wt. % selenium as Se; and 0.10 to 2.0% titanium oxide as $TiO_2$.

Glass products made according to the broadest embodiments of the invention have the following spectral properties at 4 mm control thickness: less than 6% excitation purity, 10.0 to 60.0% light transmittance using illuminant A (LTA), less than 25.0% ultra violet transmittance, and less than 50.0% infra red transmittance. This glass has a dominant wavelength between about 480 and 575.5 nanometers. Generally, as the quantities of the colorants increase, the % transmittance will go down. Similarly, generally as the glass thickness increases for a given glass composition, the transmittance of the thicker glass will decrease. While glass made according to the float glass process, which is the preferred process for making the present invention glass composition, is typically between 2.0 to 12.0 millimeters, the glass produced according to this invention is not meant to be so limited.

DETAILED DESCRIPTION OF THE INVENTION

Flat soda-lime-silica glass, used in the automotive and architectural industries and conveniently made by the float glass process, is generally characterized by the following basic composition shown in Table I, the amounts of the components being based on a weight percentage of the total glass composition:

TABLE I

| Oxide Component | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The neutral gray-green glass composition of the present invention employs this basic soda-lime-silica glass composition wherein further in the present invention composition CaO+MgO is 6 to 15% and $Na_2O+K_2O$ is 10 to 20%. The basic glass compositions often contain an amount of iron oxide as an impurity depending on the trace amounts in the batch materials. Preferably, $SO_3$ in the invention glass composition is 0.10 to 0.30 wt. %, more preferably 0.14 wt. % to 0.25 wt. %. In addition, the neutral graygreen glass composition consists essentially of the following coloring components: iron oxide; cobalt oxide; selenium; and titanium dioxide.

The total iron oxide as $Fe_2O_3$ is present in the invention composition glass in quantities of 0.9 to 1.90 weight %. All weight percents disclosed herein are based on the total weight of the invention glass composition. The iron oxide incorporated in the composition lowers both the ultra violet and the infra red transmittance of the glass products. More particularly, the iron oxide performs two functions in this glass system: (1) the oxidized form of iron oxide ($Fe_2O_3$) absorbs in the ultra violet portion of the spectrum providing low ultra violet transmittance, and (2) the reduced form of iron oxide (FeO) absorbs in the infra red portion of the spectrum and the resultant glass thus has a lowered infra red transmittance. Both absorbing functions of the iron oxide are especially valuable when the glass product is used in automobiles. When heat is absorbed by the glass, the load on air conditioners is initially reduced and there is less total heat in the vehicle to cool.

Cobalt as Co is present as a coloring component in the glass composition in an amount of 0.002 to 01025 wt. %, the cobalt functioning to absorb light from about 580 to 680 nanometers in the visible portion of the spectrum. The cobalt is generally included in the batch materials in the form of cobalt oxide ($Co_3O_4$). Selenium (Se) is present as a coloring component in an amount of 0.001 to 0.0060 wt. %, the selenium functioning to absorb light from about 230 to 540 nanometers of the visible spectrum. It is necessary to carefully balance the amount of absorption from selenium with that of cobalt oxide to achieve a neutral gray appearance.

The desire and difficulty of this invention is to make glass products that are below 6.0% excitation purity while simultaneously having a dominant wavelength between 480 and 575.5 nanometers, i.e, being gray to green in color. As mentioned above, the importance of the present invention glass having a gray-green color is that the majority of other truck and automotive glasses, used for example as the windshield, are a green to gray color; therefore glass of this invention is desirably able to be used in a vehicle with these other green products since it is of similar color. Glasses with a very low light transmittance (10 to 25% using illuminant A (LTA)) are somewhat less dependent on the particular dominant wavelength because it is difficult to readily see through these glasses at 3.8 to 4.8 mm. thickness, typical window thicknesses, making their precise color less discernable. However, for glasses of the present invention having LTAs that would optimally be used in vehicles (between 25 and 60% LTA), it would be most desirable to have such glass appear to be of green color by transmittance.

The problem of precise color control described above was solved by employing titanium dioxide in particular amounts between about 0.1 and 2.0 wt. %, in combination with the other colorants disclosed above, in the gray-green glass of the invention composition. To be the desired gray-green color, the dominant wavelength using Illuminant C must be between 480 and 575.5 nanometers using the C. I. E. convention with a 2° observer. Titanium dioxide was found to shift the dominant wavelength within the range of 480 to 575.5 nanometers using Illuminant C while still allowing the maintenance of the other desired optical properties. Titanium dioxide as incorporated in the present invention glass composition, in addition to controlling the dominant wavelength of the glass compositions, performs two other important functions: (1) it absorbs light in the ultra violet portion of the spectrum, and (2) it aids in lowering the excitation purity of the glass product.

In addition to having the required dominant wavelength disclosed, glass products within the scope of this invention have the following spectral properties when measured at 4.0 mm control thickness: less than 6% excitation purity, 10.0 to 60.0% light transmittance using illuminant A (LTA), less than 25.0% ultra violet transmittance, preferably less than about 10.0% when the glass has less than 35.0% LTA, and infra red transmittance is less than 50.0%. Generally as the glass transmittance at 4 mm. control thickness increases, the percent excitation purity desirably is lower to ensure a gray to green color by transmission.

As would be appreciated by those skilled in the art, processing aids are generally added to the glass batch during the melting and processing, e.g., to maintain the proper balance of redox conditions or as fining agents. For example, carbocite (anthracite coal) when added to the glass composition has the effect of reducing a portion of the $Fe_2O_3$ to FeO to achieve lower infra red transmittance. Sodium and/or potassium nitrate are used in glass batches of the invention to maintain oxidizing conditions early in the melting process which aids in selenium retention. Nitrates have been used by others to improve selenium retention. Careful balance must be maintained between the reducing conditions from the carbocite and the oxidizing conditions from the nitrates used to improve selenium retention in the glass, because the oxidizers also act upon the iron oxide to shift the redox from FeO toward $Fe_2O_3$ while carbocite shifts the iron oxide equilibrium in the opposite direction.

Table II lists the preferred raw material batch ingredients for providing compositions according to embodiments of the present invention.

TABLE II

| BATCH MATERIAL | RANGE MASS (LBS.) |
| --- | --- |
| Sand | 1000 |
| Soda Ash | 290 to 320 |
| Dolomite | 215 to 260 |
| Limestone | 75 to 90 |
| Salt Cake | 8 to 18 |
| Rouge | 16 to 26 |
| Titanium Dioxide | 1.4 to 7.0 |
| Sodium Nitrate | 5 to 15 |
| Carbocite (70% C) | 0.3 to 1.0 |

TABLE II-continued

| BATCH MATERIAL | RANGE MASS (LBS.) |
| --- | --- |
| Cobalt Oxide (72% Co) | 0.25 to 0.36 |
| Selenium | 0.20 to 0.70 |

Table III contains the preferred ranges of resultant oxide constituents for my new glass compositions.

TABLE III

| Oxide Component | Weight % |
| --- | --- |
| $SiO_2$ | 71 to 74 |
| $Al_2O_3$ | 0.15 to 0.25 |
| $Fe_2O_3$ | 1.20 to 1.85 |
| CaO | 8.40 to 8.70 |
| MgO | 3.5 to 4.00 |
| $Na_2O$ | 13.00 to 13.80 |
| $K_2O$ | 0 to 0.10 |
| $TiO_2$ | 0.10 to 0.50 |
| $SO_3$ | 0.14 to 0.25 |
| Co (metal) | 0.0130 to 0.0190 |
| Se (metal) | 0.0010 to 0.0040 |

The preferred glass compositions disclosed above, preferably have the following properties.

| Preferred Glass Property Ranges (4 mm. thick glass sheet) | |
| --- | --- |
| Visible Transmission (Ill. A): | 16-20% |
| Ultraviolet Transmission: | 5-10% |
| Infrared Transmission: | 8-19% |
| Total Solar Transmission: | 12-20% |
| Dominant Wavelength: | 488-560 nm. |
| Excitation Purity: | 0.0-6.0% |
| FeO/Total Iron Oxide as $Fe_2O_3$ Ratio: | 0.15-0.30 |

Certain preferred embodiments of the invention composition glass were made from the batch ingredients (in grams) listed in the table directly below. The compositions were made according to the following procedure. The batches were weighed (typically about 170 grams total) on a laboratory balance and mixed with in a glass jar with a laboratory shaker for 10 minutes each. Each mixed batch was placed into a platinum-rhodium crucible which is about 2" tall with about a 2.5" inside diameter and 4.5 ml. of water is mechanically mixed into the raw batch. Crucibles were placed into a natural gas/air furnace pre-heated to 2600° F. with 3 to 5 other crucibles. Furnace temperature recovered to 2600° F. in about 30 minutes. After two hours melting, each crucible was removed in turn, glass in the crucible was fritted by quenching in cold water, and the fragments were mixed in the crucible and all crucibles were returned to the furnace. Furnace temperature was brought back to 2600° F. and the fritting procedure was repeated as above once the operating temperature was attained, about 45 minutes. All glass samples were melted for another 3 hours and each sample was poured into a 2.5" inside diameter graphite mold to shape the glass samples for subsequent grinding and polishing. All samples were placed into an annealing furnace, brought up to 1050° F., held for 4 hours, then allowed to slowly cool to room temperature in about 16 hours. Samples were ground and polished and spectral properties were measured on each sample; spectral properties were calibrated to a control thickness of 4 mm. Samples were then chemically analyzed via X-ray fluorescence or other tests conducted as needed. Spectral properties of the compositions are also listed in the table.

TABLE IV

| | Example 1 | Example 2 | Example 3 | Example 4 | Example 5 |
| --- | --- | --- | --- | --- | --- |
| Sand | 100.76 | 100.00 | 100.78 | 100.00 | 100.00 |
| Soda Ash | 31.65 | 31.41 | 31.65 | 31.41 | 31.41 |
| Limestone | 7.30 | 7.25 | 7.31 | 7.25 | 7.25 |
| Dolomite | 26.03 | 25.83 | 26.03 | 25.83 | 25.83 |
| Salt Cake | 1.1043 | 1.0971 | 1.1052 | 1.0961 | 1.0952 |
| Sodium Nitrate | 0.5234 | 0.5226 | 0.5239 | 0.5204 | 0.5203 |
| Rouge | 1.6906 | 2.1031 | 1.6911 | 2.5430 | 2.1042 |
| Carbocite | 0.0917 | 0.0913 | 0.0925 | 0.0914 | 0.0918 |
| Cobalt Oxide | 0.0344 | 0.0302 | 0.0345 | 0.0266 | 0.0338 |
| Selenium | 0.1341 | 0.0699 | 0.0993 | 0.0646 | 0.0839 |
| Titanium Dioxide | 0.6786 | 0.2496 | 0.6784 | 0.5298 | 0.5298 |
| % LTA | 18.9 | 17.8 | 19.0 | 18.9 | 18.2 |
| % UV | 9.2 | 7.3 | 9.9 | 5.3 | 7.8 |
| % IR | 18.5 | 13.5 | 18.0 | 9.5 | 14.5 |
| % TSET | 18.8 | 15.1 | 18.6 | 12.8 | 16.0 |
| Dominant Wavelength | 500.9 | 559.0 | 487.9 | 544.1 | 490.5 |
| Excitation Purity, % | 1.3 | 3.8 | 4.0 | 4.9 | 5.2 |

In the tables here, % LTA is defined to be the luminous transmittance measured under CIE standard illuminant A. The % UV is the % ultra violet transmittance measured between 280 and 400 nanometers while the % IR is the % infra red transmittance measured over the range of 720 to 2120 nanometers. The % TSET is the % total solar energy transmittance as defined in U.S. Pat. No. 4,792,536 by the equation: %TSET=0.44 %LTA+0.53 %IR+0.03 %UV Still other embodiments of heat absorbing glasses within the scope of this invention, which display a wide range of % LTA, are listed in Table V based on their batch ingredients (grams). The table also lists the resultant glasses spectral properties.

TABLE V

| | Example 6 | Example 7 | Example 8 | Example 9 | Example 10 |
| --- | --- | --- | --- | --- | --- |
| Sand | 100.76 | 100.79 | 100.99 | 100.00 | 100.00 |
| Soda Ash | 31.65 | 31.65 | 31.72 | 31.41 | 31.41 |
| Limestone | 7.30 | 7.31 | 7.32 | 7.25 | 7.25 |
| Dolomite | 26.03 | 26.03 | 26.08 | 25.83 | 25.83 |
| Salt Cake | 1.1047 | 1.1036 | 1.1068 | 1.0960 | 1.0961 |
| Sodium Nitrate | 0.5228 | 0.5244 | 0.5249 | 0.5204 | 0.5202 |
| Rouge | 2.1195 | 2.1200 | 1.4003 | 1.3810 | 1.3810 |
| Carbocite | 0.0916 | 0.0922 | 0.0922 | 0.0913 | 0.0914 |
| Cobalt Oxide | 0.0390 | 0.0366 | 0.0194 | 0.0095 | 0.0038 |
| Selenium | 0.1266 | 0.0919 | 0.0708 | 0.0210 | 0.0210 |
| Titanium Dioxide | 0.2525 | 0.2530 | 0.6782 | 0.5259 | 0.5259 |
| % LTA | 12.6 | 15.0 | 34.1 | 49.2 | 59.6 |
| % UV | 5.6 | 6.7 | 17.9 | 23.9 | 27.0 |
| % IR | 12.5 | 13.3 | 22.5 | 23.4 | 26.7 |
| % TSET | 12.6 | 14.0 | 27.0 | 33.1 | 38.5 |
| Dominant Wavelength | 570.7 | 527.9 | 497.8 | 497.9 | 547.5 |
| Excitation Purity, % | 4.4 | 1.2 | 2.3 | 3.6 | 3.8 |

The glass compositions made within the scope of this invention and listed in Table VI show the manner in which titanium dioxide changes the composition's dominant wavelength and excitation purity. In the table, the batch ingredients (in grams) used to make the glass composition as well as their spectral properties are listed.

TABLE VI

|  | Example 11 | Example 12 | Example 13 |
| --- | --- | --- | --- |
| Sand | 100.00 | 100.00 | 100.00 |
| Soda Ash | 31.41 | 31.41 | 31.41 |
| Limestone | 7.25 | 7.25 | 7.25 |
| Dolomite | 25.83 | 25.83 | 25.83 |
| Salt Cake | 1.0966 | 1.0967 | 1.0969 |
| Sodium Nitrate | 0.5203 | 0.5208 | 0.5209 |
| Rouge | 2.0968 | 2.1006 | 2.1047 |
| Carbocite | 0.0915 | 0.0916 | 0.0911 |
| Cobalt Oxide | 0.0327 | 0.0318 | 0.0337 |
| Selenium | 0.0841 | 0.0843 | 0.0840 |
| Titanium Dioxide | 0.0 | 0.2497 | 0.5304 |
| % LTA | 19.4 | 19.1 | 18.3 |
| % UV | 10.7 | 9.2 | 7.7 |
| % IR | 13.4 | 13.8 | 16.3 |
| % TSET | 16.1 | 15.9 | 17.1 |
| Dominant Wavelength | 484.6 | 492.0 | 541.4 |
| Excitation Purity, % | 9.3 | 3.7 | 1.8 |

In Examples 11, 12, and 13 of Table VI essentially all of the batch quantities are similar in amount except for the titanium dioxide. Analysis of these glasses for $TiO_2$ showed 0.013 wt. % $TiO_2$ in Example 11 (which is from trace amounts in the sand source), 0.19 wt. % $TiO_2$ in Example 12 and 0.39 wt. % $TiO_2$ in Example 13. Example 11 is not within the scope of this invention because it does not contain added titanium dioxide within that required in the invention nor is the excitation purity low enough to be considered part of this invention. However, Examples 12 and 13 demonstrate the improvement that titanium dioxide adds to the batch to lower excitation purity and shift the dominant wavelength. Examples 11 through 13 also demonstrate the improvements in lowering the ultra violet transmittance as provided by the titanium dioxide enhanced Examples 12 and 13 glasses of this invention.

I claim:

1. A heat absorbing, neutral gray to green colored glass composition having a base glass composition comprising: 65 to 75% $SiO_2$, 10 to 18% $Na_2O$, 5 to 15% CaO, 3 to 5% MgO, 0 to 5% $Al_2O_3$, and 0 to 5% $K_2O$ and colorants consisting essentially of: 0.90 to 1.90 wt. % total iron oxide as $Fe_2O_3$; 0.002 to 0.025 wt. % cobalt oxide as Co; 0.0010 to 0.0060 wt. % selenium as Se; and 0.1 to 2.0% titanium oxide as $TiO_2$, the glass at 4 mm. control thickness having light transmittance using illuminant A of 10.0% and 60.0%, ultra violet transmittance less than 25.0%, infra red transmittance is less than about 50.0%, dominant wavelength with illuminant C between 480 and 575.5 nanometers, and an excitation purity of less than 6.0%.

2. The glass composition according to claim 1, wherein $SO_3$ present in said composition is about 0.1 to 0.3 wt. %.

3. The glass composition according to claim 1, wherein said light transmittance is between about 16–20%.

4. The glass composition according to claim 1, wherein said ultraviolet transmission is about 5–10% and said infrared transmission is about 8–19%.

5. The glass composition according to claim 1, wherein said dominant wavelength is about 488–560 nanometers.

6. The glass composition according to claim 1, wherein the FeO/total iron oxide as $Fe_2O_3$ is 0.15 to 0.30.

7. A heat absorbing, neutral gray to green colored glass composition having a base glass composition comprising: 65 to 75% $SiO_2$, 10 to 18% $Na_2O$, 5 to 15% CaO, 3 to 5% MgO, 0 to 5% $Al_2O_3$, and 0 to 5% $K_2O$ and colorants consisting essentially of: 1.2 to 1.85 wt. % total iron oxide as $Fe_2O_3$; 0.0130 to 0.0190 wt. % cobalt oxide as Co: 0.0010 to 0.0040 wt. % selenium as Se; and 0.10 to 0.50% titanium oxide as $TiO_2$; the glass at 4 mm. control thickness having light transmittance using illuminant A of 16.0% and 20.0%, ultra violet transmittance less than 10.0%, infra red transmittance is less than about 19.0%, dominant wavelength with illuminant C between 488 and 560 nanometers, and an excitation purity of less than 6.0%.

8. An automotive or architectural glazing. made from the composition of claim 1.

9. An automotive or architectural glazing made from the composition of claim 7.

* * * * *